United States Patent Office 2,753,136
Patented July 3, 1956

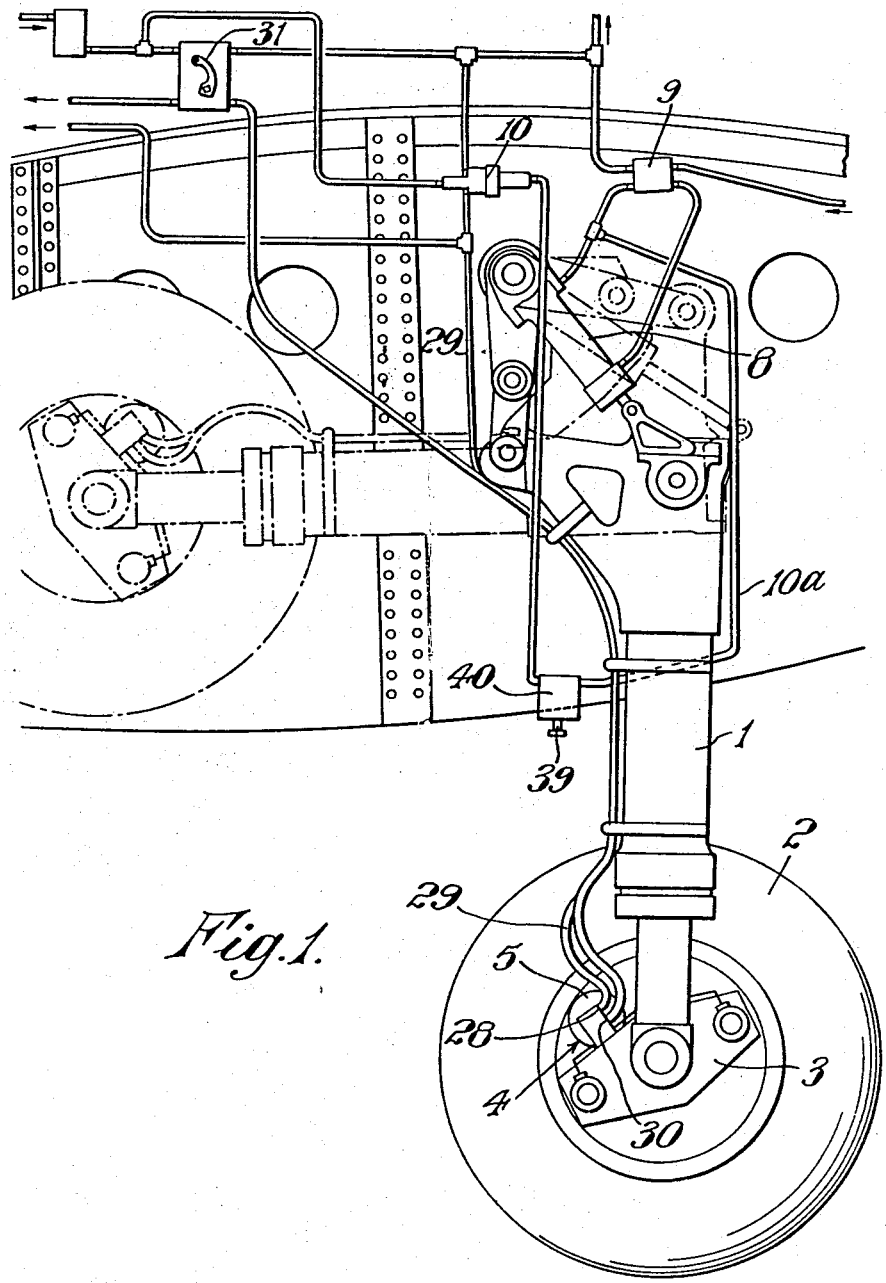

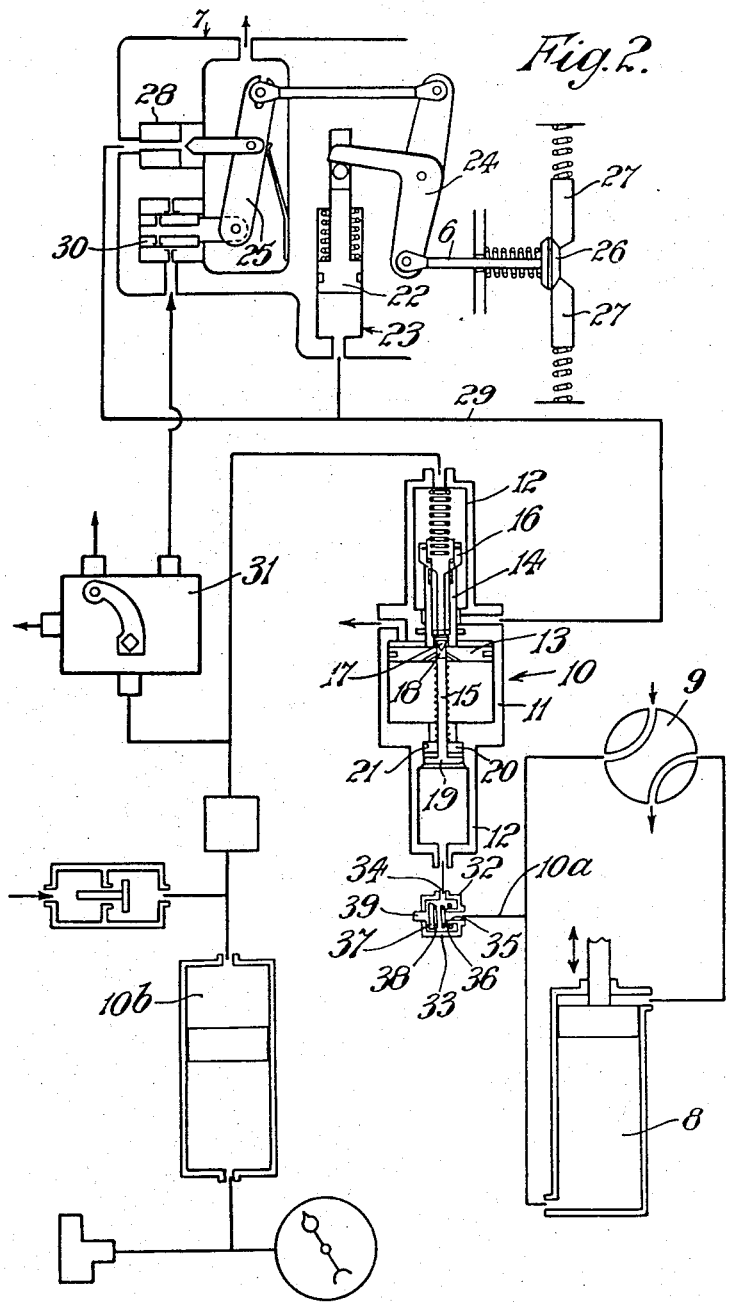

2,753,136

BRAKING SYSTEM FOR RETRACTABLE AIRCRAFT UNDERCARRIAGE

Frank Radcliffe Mortimer, Stivichale, Coventry, England, assignor to Dunlop Rubber Company Limited, London, England, a British company Application January 24, 1955, Serial No. 483,667

Claims priority, application Great Britain February 2, 1954

4 Claims. (Cl. 244—111)

My invention relates to braking systems for aircraft having retractable undercarriages.

Braking systems for aircraft incorporating means operated automatically upon retraction of the undercarriage to prevent application of the wheel brakes before the wheels rotate on landing, centrifugal releases operated by rotation of said wheels to permit the brakes to be applied and a rotary inertia apparatus to so regulate the braking pressure during the landing run that sliding or skidding of the wheels is prevented, have been more fully described in Patents 2,656,017, 2,692,100, 2,723,090 and pending application Ser. No. 430,647, filed May 18, 1954.

When an aircraft having such a system is jacked up to undergo a static undercarriage retraction and lowering test, the means is operated which automatically prevents application of the wheel brakes, so that, when the test is finished, it is impossible to apply the brakes unless the wheels are first rotated at a speed sufficient to operate the centrifugal releases and thus allow the brakes to be applied or unless other measures are taken.

My invention provides a system wherein it is impossible to operate said means when the aircraft undercarriage is retracted during a static test.

According to the invention a braking system for aircraft having a retractable undercarriage and means operated by fluid pressure on movement of the undercarriage for preventing the application of the wheel brakes before the landing wheels rotate comprises a valve interposed in a fluid pressure line controlling the operation of said means in such a position that said valve is closed automatically as the aircraft is jacked off the ground.

The valve may be operated e. g. by a microswitch actuated by the relative movement of the two parts of an oleo-leg as the aircraft is jacked off the ground. Alternatively the valve may be operated by a reduction in pressure in the leg as the weight of the aircraft is taken off the leg.

Preferably, however, the valve is located adjacent a jacking pad to which hydraulic jacks for raising the aircraft may be applied without the likelihood of damaging the structure of the aircraft. A spigot to operate the valve extends through the pad to be contacted by the jack. Thus as the jack is operated to raise the aircraft the valve is first automatically closed to prevent the passage of pressure fluid from the source to the said means for preventing the application of the brakes before the landing wheels rotate. The undercarriage can therefore be raised and lowered during the static test without the brakes being rendered inoperative.

In order that the invention may be more fully described reference is made to the accompanying drawings of which:

Figure 1 is a pictorial representation of an aircraft retractable undercarriage leg and adjacent portion of the aircraft structure into which is incorporated a braking system constructed according to the present invention.

Figure 2 is a diagrammatic representation of the braking system illustrated in Figure 1.

In this embodiment of the present invention a braking system for an aircraft having a retractable undercarriage comprises an angularly retractable undercarriage leg 1 (Figure 1) having a landing wheel 2 at one end thereof.

The wheel is provided with fluid pressure operated wheel brakes 3 of conventional type and associated with said brakes 3 and said wheel 2 is a rotary inertia-operated automatic braking apparatus 4. This apparatus comprises a housing 5 rotatable by the wheel 2 which encloses a flywheel and a drum member (not shown) which are movable angularly relative to each other between predetermined limits. A clutch mechanism (not shown) interposed between the housing 5 and the drum member rotates said member when said housing 5 is rotated but also allows the drum member to rotate relative to the housing 5 by virtue of its own inertia and that of the flywheel. Relative angular movement of the flywheel and drum member is converted to axial movement of an operating rod 6 (Figure 2) which is effective to open and close an associated valve mechanism 7.

This apparatus is more fully described in Patent No. 2,656,017.

The undercarriage leg 1 is operated, i. e. retracted and lowered, by a two-way jack 8 which is controlled by a two-way cock 9 directly under the control of a pilot. Thus movement of the cock 9 in one direction allows pressure from a source to flow to one side of the jack 8 and so retract the undercarriage leg 1. This side of the jack is also connected to one end of a sequence valve 10 through pipe line 10a, the other end of the sequence valve 10 being connected to an alternative source of fluid pressure e. g. a fluid pressure accumulator 10b.

The sequence valve 10 comprises a cylindrical housing 11 having a tubular extension 12 at each end and a piston 13 fluid tightly slidable therein, said piston 13 having a tubular member 14 extending from one face, and a rod 15 extending from the other face. The end of the tubular member 14 extending from the piston 13 is formed as a valve seat which is associated with a spring-loaded valve member 16 to which a restrictor 17 is secured which in turn is associated with a passage 18 in the piston 13. The rod 15 which extends from the piston 13 is provided at its end with a flange 19 against which a plug 20 which is slidable on the rod 15 is normally spring urged, and which forces the plug 20 into sealing engagement with a smaller diameter part 21 of the associated tubular extension 12 when the piston 13 is moved by fluid pressure to one end of the cylindrical housing 11. This valve 10 and its manner of operation is more fully described in our co-pending application Ser. No. 430,647. The sequence valve is also connected to a cylinder 22 of a piston and cylinder mechanism 23 incorporated in a device which, in combination with the rotatary inertia automatic braking apparatus, prevents the application of the wheel brakes before the landing wheel rotates.

The device consists of a bell crank lever 24 secured to the shaft with which the valve beam 25 of the valve mechanism 7 of the automatic braking apparatus 4 is pivotally associated having one of its links connected to the operating rod 6 of the automatic braking apparatus and the other link adapted to abut a part associated with the piston 22 of the said incorporated piston and cylinder mechanism 23 whereby the operating rod is moved axially when the said cylinder is pressurized. The operating rod 6 is provided with a head 26 which is drawn through a pair of spring-loaded releases 27 and held thereby until the releases 27 are moved outwardly by centrifugal force when the wheel 2 rotates on landing.

This device and its manner of operation is more fully described in U. S. Patent No. 2,723,090.

The sequence valve 10 is also connected to the outlet valve 28 of the valve mechanism 7 associated with the rotary inertia automatic braking apparatus 4 through pipe line 29, the inlet valve 30 thereof being connected, through a manually-operated brake control 31, to a source of fluid pressure, e. g. the pressure accumulator 10b.

This system, and its method of operation are fully described in our co-pending application Ser. No. 430,647.

Interposed in the fluid pressure line 10a between the two-way cock 9 and the adjacent end of the sequence valve 10 is a valve 32, comprising a housing 33 having an outlet connection 34 to said sequence valve 10 and a tubular inlet connection 35 which extends inwardly of the housing 33 and is formed at its end as a valve seat 36. A valve closure member 37 is axially-slidable in said housing 33 to fluid-tightly seat on said valve seat 36, and is normally held in open position by a spring 38. A spigot 39 extends axially from the side of the valve closure member 37 remote from the valve seat 36 and fluid-tightly through the wall of the housing 33 remote from the inlet connection.

The housing 33 is located adjacent a jacking pad 40 built into the aircraft frame to provide a point strong enough to support the weight of the aircraft when jacked up, and the spigot 39 of the valve 32 projects through said pad 40 and stands proud therefrom. Thus when the aircraft is jacked up to undergo static undercarriage retraction and lowering tests the valve 37 is closed against its spring 38 by the jack, hence pressure fluid is prevented from flowing to the sequence valve 10, when the undercarriage leg is retracted, and actuation of the piston and cylinder mechanism 23 for preventing the brakes 3 from being applied is thereby prevented.

Having described my invention, what I claim is:

1. A braking system for aircraft having a retractable undercarriage having landing wheels and fluid operated brakes which comprises means operated by fluid pressure for closing the supply of fluid to said brakes before the landing wheels rotate, a fluid supply open for supplying fluid to said means when the undercarriage is retracted and a valve in said line to close the supply of fluid to said means.

2. A braking system for aircraft having a retractable undercarriage having landing wheels and fluid operated brakes which comprises releasable valve means for closing a fluid supply to said brakes, centrifugal means actuated by the rotation of the landing wheels to release said releasable valve means, fluid operable means comprising a fluid supply line opened by the retraction of said landing wheels and said undercarriage for supplying fluid to said means and a valve in said line to close the supply of fluid to said means.

3. A braking system for aircraft having a retractable wheeled undercarriage and comprising fluid-pressure operated wheel brakes, a rotary inertia device for automatically controlling the supply of fluid pressure to said brakes, a centrifugally-releasable mechanism for preventing the operation of said device before the wheels rotate on landing, a fluid-pressure device operated automatically on retraction of the undercarriage for locking said centrifugally-releasable mechanism in position to prevent operation of said brakes, fluid operated means to render said device inoperative comprising a pressure line controlling the operation of said device and positioned to be closed by a jack or like means for raising the aircraft off the ground and a normally spring-opened valve interposed in said pressure line.

4. The braking system of claim 3 in which said normally spring-opened valve is positioned to be closed by means of lifting said aircraft.

References Cited in the file of this patent

UNITED STATES PATENTS

| | | |
|---|---|---|
| 1,851,129 | Reardan | Mar. 29, 1932 |
| 2,459,665 | Majneri | Jan. 18, 1949 |